(12) United States Patent
Linguraru et al.

(10) Patent No.: US 11,042,989 B2
(45) Date of Patent: Jun. 22, 2021

(54) IMAGE SEGMENTATION OF COMPLEX STRUCTURES

(71) Applicant: CHILDREN'S NATIONAL MEDICAL CENTER, Washington, DC (US)

(72) Inventors: Marius George Linguraru, Washington, DC (US); Robert A. Avery, Washington, DC (US); Awais Mansoor, Washington, DC (US)

(73) Assignee: CHILDREN'S NATIONAL MEDICAL CENTER, Washington, DC (US)

( * ) Notice: Subject to any disclaimer, the term of this patent is extended or adjusted under 35 U.S.C. 154(b) by 94 days.

(21) Appl. No.: 16/348,042

(22) PCT Filed: Dec. 11, 2017

(86) PCT No.: PCT/US2017/065562
§ 371 (c)(1),
(2) Date: May 7, 2019

(87) PCT Pub. No.: WO2018/107149
PCT Pub. Date: Jun. 14, 2018

(65) Prior Publication Data
US 2019/0347802 A1 Nov. 14, 2019

Related U.S. Application Data

(60) Provisional application No. 62/470,728, filed on Mar. 13, 2017, provisional application No. 62/432,287, filed on Dec. 9, 2016.

(51) Int. Cl.
*G06T 7/149* (2017.01)
*G06T 7/12* (2017.01)
(Continued)

(52) U.S. Cl.
CPC .............. *G06T 7/149* (2017.01); *G06K 9/342* (2013.01); *G06K 9/46* (2013.01); *G06K 9/6206* (2013.01);
(Continued)

(58) Field of Classification Search
CPC . G06T 7/149; G06T 7/12; G06T 2207/10081; G06T 2207/10088;
(Continued)

(56) References Cited

U.S. PATENT DOCUMENTS 5,920,374 A  7/1999  Vaphiades et al.
6,591,004 B1  7/2003  Vanessen et al.
(Continued)

OTHER PUBLICATIONS

Zhang, Ya Q., Jing Li, Liang Xu, Li Zhang, Zhen C. Wang, Hua Yang, Chang X. Chen, Xi S. Wu, and Jost B. Jonas. "Anterior visual pathway assessment by magnetic resonance imaging in normal-pressure glaucoma." Acta ophthalmologica 90, No. 4 (2012): e295-e302.*

(Continued)

*Primary Examiner* — Zhitong Chen
(74) *Attorney, Agent, or Firm* — Oblon, McClelland, Maier & Neustadt, L.L.P.

(57) ABSTRACT

Image segmentation of a structure of complex shape proceeds by acquiring by circuitry, a plurality of training images of the structure. A shape model of the structure is formed by fusing the plurality of training images. The shape model is partitioned by circuitry into a predetermined number of portions, an appearance and shape of each portion being determined by a classifier.

26 Claims, 5 Drawing Sheets

(51) Int. Cl.
*G06K 9/46* (2006.01)
*G06K 9/62* (2006.01)
*G06K 9/34* (2006.01)

(52) U.S. Cl.
CPC ............ *G06T 7/12* (2017.01); *G06K 2209/05* (2013.01); *G06T 2207/10081* (2013.01); *G06T 2207/10088* (2013.01); *G06T 2207/10104* (2013.01); *G06T 2207/10132* (2013.01); *G06T 2207/20081* (2013.01); *G06T 2207/30016* (2013.01); *G06T 2207/30041* (2013.01)

(58) Field of Classification Search
CPC . G06T 2207/10104; G06T 2207/10132; G06T 2207/20081; G06T 2207/30016; G06T 2207/30041
See application file for complete search history.

(56) References Cited

U.S. PATENT DOCUMENTS

| | | | |
|---|---|---|---|
| 7,496,217 | B2 | 2/2009 | Tank |
| 2003/0013951 | A1 | 1/2003 | Stefanescu et al. |
| 2006/0171586 | A1 | 8/2006 | Georgescu et al. |
| 2011/0176710 | A1* | 7/2011 | Mattiuzzi ............... G06T 7/48 382/128 |
| 2014/0037198 | A1 | 2/2014 | Larlus-Larrondo et al. |
| 2015/0043809 | A1* | 2/2015 | Reda ..................... G06K 9/468 382/159 |
| 2016/0063720 | A1* | 3/2016 | Han ........................ G06T 7/10 382/131 |
| 2016/0157746 | A1 | 6/2016 | Ellingson |

OTHER PUBLICATIONS

Freiman, Moti, M. Werman, and Leo Joskowicz. "A curvelet-based patient-specific prior for accurate multi-modal brain image rigid registration." Medical Image Analysis 15, No. 1 (2011): 125-132.*
International Search Report and Written Opinion dated Feb. 15, 2018 in PCT/US2017/065562 filed on Dec. 11, 2017.

* cited by examiner

T1 only

T1+T2+FLAIR

T1+ T2+FLAIR+SAE Features

IMAGE SEGMENTATION OF COMPLEX STRUCTURES

RELATED APPLICATION DATA

This application claims the benefit of priority under 35 U.S.C. 119(e) of provisional application No. 62/470,728 entitled APPARATUS AND METHOD FOR SEGMENTING COMPLEX STRUCTURES filed on Mar. 13, 2017, and provisional application No. 62/432,287 entitled AUTOMATED ANALYSIS OF ANTERIOR VISUAL PATHWAY USING MYULTISEQUENCE MRI filed on Dec. 9, 2016. The entire disclosures of these provisional patent applications are incorporated herein by reference.

BACKGROUND

The anterior visual pathway (AVP) is responsible for transmitting all visual signals from retina to the brain. AVP consists of (a) an optic nerve pair also known as the cranial nerve II (CNII), (b) the optic chiasm: the part of AVP where nearly half of the fibers from each optic nerve pairs cross to the contralateral side, and (c) an optic tract pair. There are twelve cranial nerves, in order from I to XII: olfactory nerve, optic nerve, oculomotor nerve, trochlear nerve, trigeminal nerve, abducens nerve, facial nerve, vestibulocochlear nerve, glossopharyngeal nerve, vagus nerve, spinal accessory nerve, and hypoglossal nerve. MRI sequences are widely used to non-invasively study and characterize diseases. AVP diseases include optic neuritis, optic nerve hypoplasia, and optic pathway glioma (OPG). OPGs are low-grade tumors that occur at any location along the AVP. Neurofibromatosis type 1 (NF1), one of the most common genetic disorders, is a cancer predisposition syndrome in which 20% developed OPGs during childhood. OPGs can be isolated to one anatomic location (i.e., optic nerve) or simultaneously involve multiple structures of the AVP. For example, some NF1-OPGs involve only the optic nerve(s), while a majority involves the nerve(s) and chiasm or the entire AVP. Unlike most brain tumors, OPGs rarely cause death but instead can cause severe vision loss resulting in lifelong disability. The clinical management of NF1-OPGs is challenging as tumor growth or regression is highly variable within and between subjects, and can occur anywhere along the AVP.

Recently, a quantitative metric for the detection of OPG in NF1 patients using T1-weighted MRI sequences have been devised. The metric involves non-invasive quantification of the AVP including volume and diameter of the optic nerves, optic chiasm, and optic nerves from T1-weighted MRI sequences in healthy controls and subjects with OPG. The proposed metric showed promising results in the early detection and longitudinal tracking of tumors in OPG patients. However, the effective translation of the metric into clinical practice requires a robust automated segmentation method of the AVP, since it is impractical to perform time-intensive manual segmentation of morphologically complex structures. Moreover, the size and the appearance of AVP make accurate manual delineation much harder than manual segmentation of other larger organs. Automated segmentation of AVP from MRI is challenging due to their thin-long shape, poor contrast, and lack of sufficient discriminative features with the neighboring tissues. Moreover, changes in tumor shape and size can occur anywhere along the AVP making the automation of segmentation difficult. Research and development in this area is ongoing.

SUMMARY

The present disclosure provides for an apparatus and corresponding methods for segmenting complex structures from images, such as magnetic resonance imaging (MRI) images.

In one embodiment, image segmentation of a structure of complex shape proceeds by acquiring by circuitry, a plurality of training images of the structure. A shape model of the structure is formed by fusing the plurality of training images. The shape model is partitioned by circuitry into a predetermined number of portions, an appearance and shape of each portion being determined by a classifier. The partitioned shape model is then used to automate the segmentation of the complex structure from the image.

BRIEF DESCRIPTION OF DRAWINGS

Various embodiments of this disclosure that are provided as examples will be described in detail with reference to the following figures, wherein like numerals reference like elements, and wherein.

DETAILED DESCRIPTION

Figure 1:
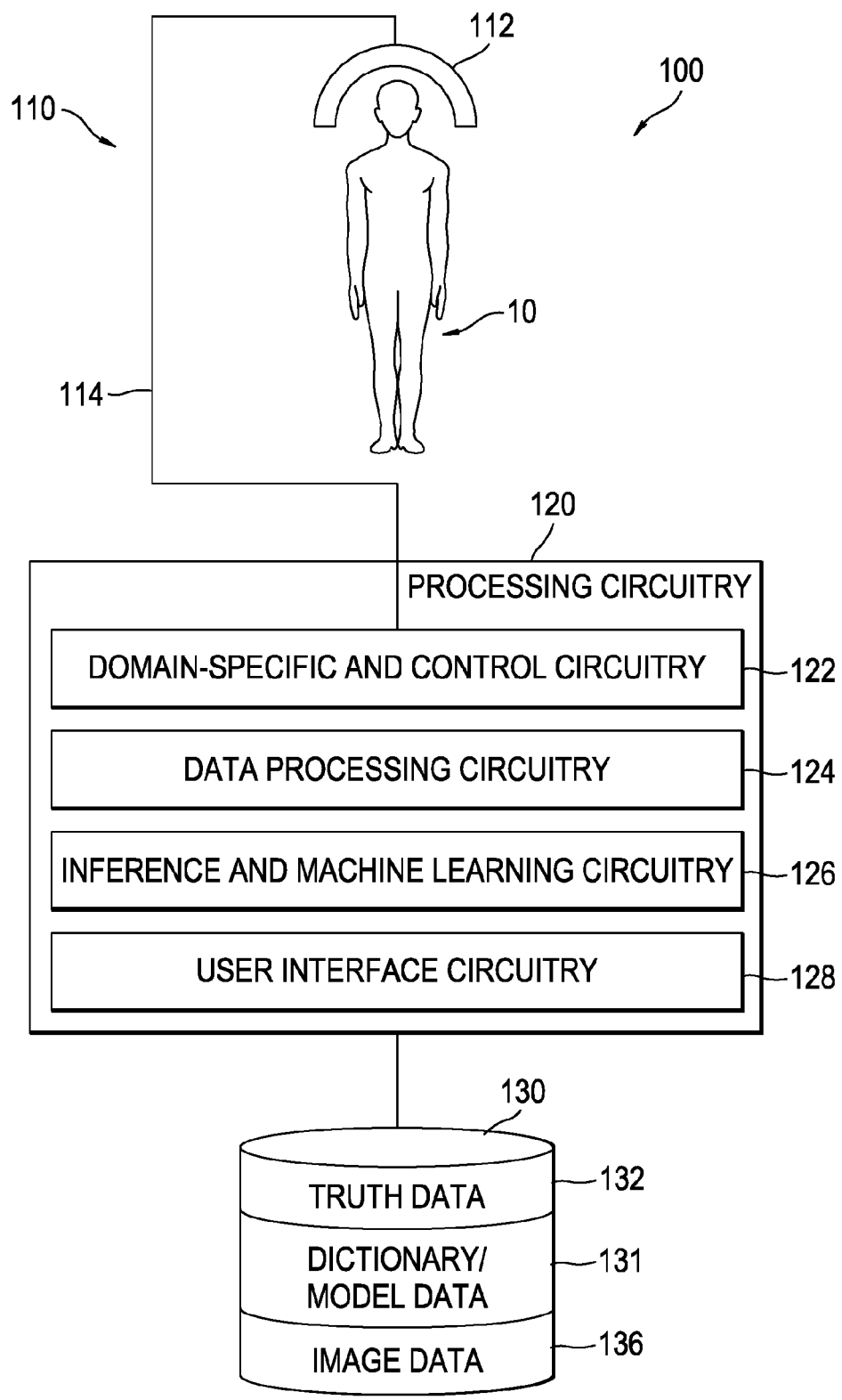
FIG. 1 is a schematic block diagram of an example diagnostic system by which the present general inventive concept can be embodied.

The present inventive concept is best described through certain embodiments thereof, which are described in detail herein with reference to the accompanying drawings, wherein like reference numerals refer to like features throughout. It is to be understood that the term "invention," when used herein, is intended to connote the inventive concept underlying the embodiments described below and not merely the embodiments themselves. It is to be understood further that the general inventive concept is not limited to the illustrative embodiments described below and the following descriptions should be read in such light.

The word "exemplary," when used herein, is intended to mean "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expression is intended, the ordinarily skilled artisan will recognize numerous techniques to carry out physical manifestations of the principles being mathematically expressed.

This disclosure presents an improved technology by incorporating, among other things: (1) a fast marginal space deep learning approach for an accurate initialization of the statistical shape models; (2) a three-dimensional (3D) multiscale intensity normalization method of volumetric medical image by energy standardization of curvelet subbands; (3) a partitioned appearance model that combines the complimentary information from a plurality of images, for example T1-weighted, fat-saturated T2-weighted, and FLAIR MRI sequences; and (4) a deep learning paradigm to learn feature representation from the plurality of imaging for steering the shape model of the complex structure.

FIG. 1 is a schematic block diagram of an example diagnostic system 100 by which the present disclosure can be embodied. As illustrated in the figure, diagnostic system 100 may comprise interface circuitry 110, to, among other things, acquire characteristics of a subject under test 10, and processing circuitry 120 to, among other things, process the acquired characteristics and to render the processed data into a perceivable form, such as an image on a display device. It is to be understood that subject under test 10 need not be a human subject as indicated in the figure.

Example interface circuitry 110 may comprise a sensing circuitry component 112, by which information is acquired from subject under test 10. Sensing circuit component 112 may include circuitry to convey an excitation signal to subject under test 10 as well as circuitry to detect a response to the excitation signal by the subject under test 10. Excitation and response signals may be conveyed or otherwise controlled via suitable data and control circuitry 114 that communicatively couples sensing circuitry component 112 and processing circuitry 120. Skilled artisans will recognize several technologies that fit these system characteristics, including MRI), computed tomography (CT), positron emission tomography (PET), photographic images among others. Without loss of generality, the following descriptions address the MRI case, with analogous operations and components being applicable to other imaging technologies.

As illustrated in FIG. 1, example processing circuitry 120 may comprise one or more functional components, such as, but not limited to a domain-specific processing and control circuitry component 122, a data processing circuitry component 124, an inference and machine learning circuitry component 126 and a user interface circuitry component 128. These components neither must be self-contained nor be discrete. Each of these components can be functionally implemented in circuitry shared across all the components. The division of processor circuitry 120 into separate functional components is intended solely as a way by which certain operating principles of the present disclosed concept may be succinctly explained.

Exemplary domain-specific processing and control circuitry component 122 provides the data processing infrastructure by which domain-specific data (CT, PET, MRI, etc.) are processed, and encoded or otherwise formatted for additional processing. For example, domain-specific processing and control circuitry component 122 may process electrical signals on data and control circuitry 114 into images or other data structures by which diagnostic procedures may be carried out. Additionally, domain-specific processing and control circuitry component 122 may provide control over, among other things, what imaging modality is in effect during individual data collection cycles. That is, in certain embodiments, images may be formed or otherwise generated from complementary image data, e.g., T1-weighted MRI sequence data (spin-lattice relaxation time), T2-weighted MRI sequence data (spin-spin relaxation time) and fluid-attenuated inversion recovery (FLAIR) MRI sequence data. Each of these modalities evokes a particular response from the various tissues comprising and surrounding the AVP, as exemplary complex structure, so that the AVP can be segmented. Domain-specific processing and control circuitry component 122 may include the circuitry necessary to carry out such MRI sequences.

Exemplary data processing circuitry component 124 provides the data processing infrastructure by which data are processed or otherwise transformed. For example, many of the image processing operations and procedures described below may be achieved by the data processing circuitry component.

Exemplary inference and machine learning circuitry component 126 provides the data processing infrastructure by which machine learning, and corresponding inferences derived from such learning, are implemented. Inference and machine learning circuitry component 126 may implement a deep learning paradigm using a stacked autoencoder (SAE) to learn deep learning feature representation from the MRI sequences for steering the shape model in AVP segmentation, particularly useful in the cases with structural pathologies. The machine learning techniques of present disclosed embodiments are described below.

Exemplary user interface circuitry component 128 provides the infrastructure by which a user interacts with diagnostic system 100. For example, user interface circuitry component 128 may include a display device and one or more human interface devices, such as a keyboard and/or mouse.

Diagnostic system 100 may further include data storage circuitry 130 by which diagnostic and system data may be retrievably and persistently stored. For example, data storage circuitry may store, among other things, ground truth data (images with labels as annotated by a human expert), dictionary and model data 134 generated and utilized by, for example, inference and machine learning circuitry component 126, and image data 136, which may include both reference and test images.

Upon review of this disclosure, it should be apparent to the skilled artisan how the present disclosure can be embodied in a wide variety of applications and implementations. It is to be understood that the present disclosure need not be configured for human health diagnostics as illustrated in FIG. 1. Indeed, the present disclosure need not be embodied in diagnostic equipment at all. The inventive concept may be applied wherever the nature of complex structures is to be discerned by machine.

Embodiments of the present disclosure process image data to segment or otherwise isolate particular complex structures within subject under test 10. In the following descriptions, such complex structure will be fulfilled by AVP, but other structures may be segmented as well, as those skilled in the medical imaging arts or any related technology will attest upon review of this disclosure. The AVP is an apt structure for discussing embodiments of the disclosure due to the challenges it presents in its localization from surrounding tissues. As will be demonstrated in the paragraphs that follow, such challenges are overcome by embodiments of the present disclosure.

Figure 2:
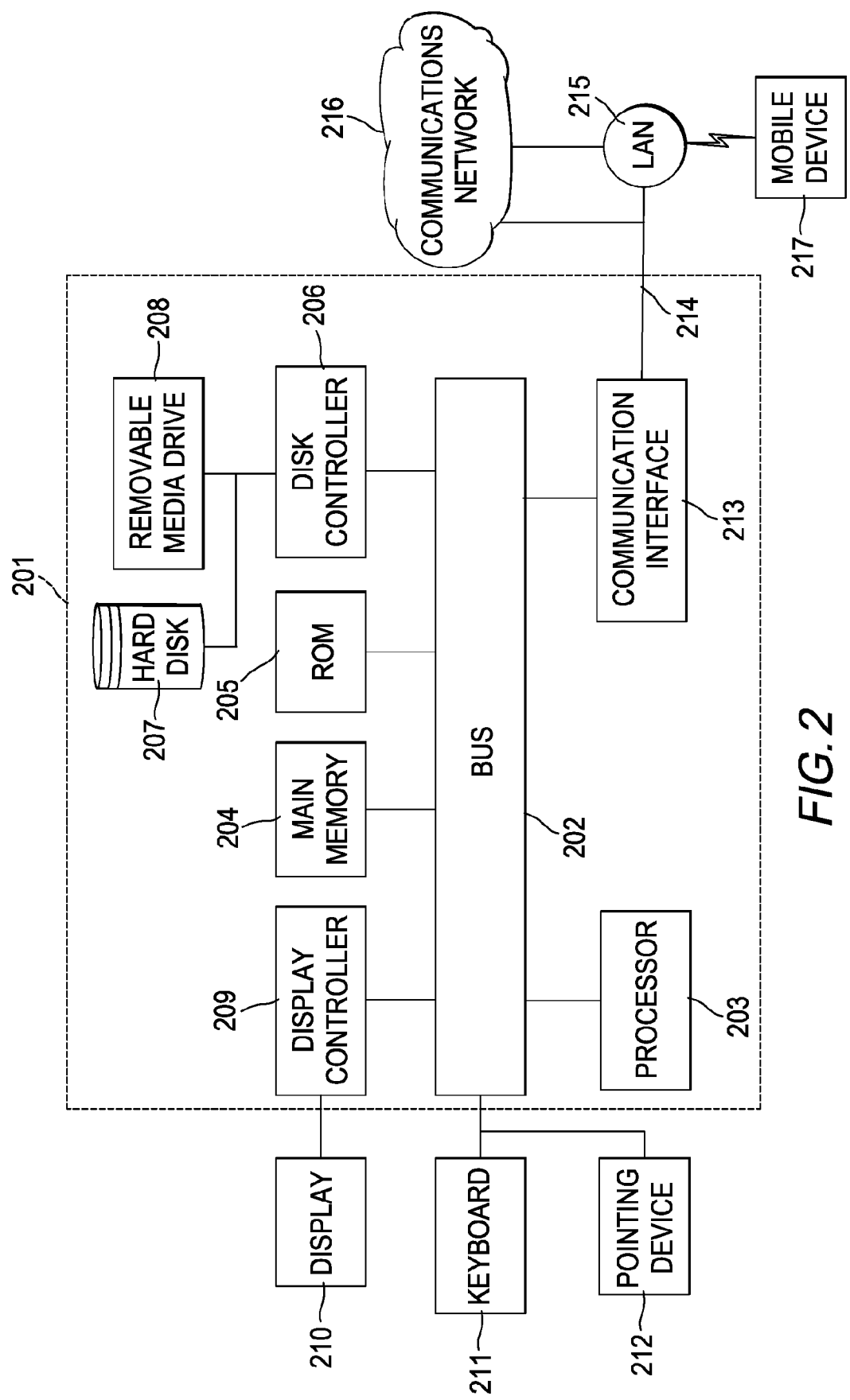
FIG. 2 is a schematic block diagram of an example computer system by which various aspects of the present general inventive concept can be embodied.

The various features discussed above may be implemented by a computer system (or programmable logic). FIG. 2 illustrates such a computer system 201. The computer system 201 of FIG. 2 may be a special-purpose machine. In one embodiment, the computer system 201 is a particular, special-purpose machine when the processor 203 is programmed to process and analyze MRI data capturing characteristics of the AVP.

Example computer system 201 includes a disk controller 206 coupled to a bus 202 to control one or more non-transitory storage devices for storing information and instructions, such as a magnetic hard disk 207, and/or a removable media drive 208 (e.g., floppy disk drive, read-only compact disc drive, read/write compact disc drive, compact disc jukebox, tape drive, and removable magneto-optical drive). The storage devices may be added to the computer system 201 using an appropriate device interface (e.g., small computer system interface, integrated device electronics (IDE), enhanced-IDE, direct memory access (DMA), or ultra-DMA).

The computer system 201 may also include special purpose logic devices (e.g., application specific integrated circuits) or configurable logic devices (e.g., simple programmable logic devices, complex programmable logic devices, and field programmable gate arrays).

The computer system 201 may also include a display controller 209 coupled to the bus 202 to control a display 210, for displaying information to a computer user. Example computer system 201 includes input devices, such as a keyboard 211 and a pointing device 212, for interacting with a computer user and providing information to the processor 203. The pointing device 212, for example, may be a mouse, a trackball, a finger for a touch screen sensor, or a pointing stick for communicating direction information and command selections to the processor 203 and for controlling cursor movement on the display 210.

Example processor 203 executes one or more sequences of one or more instructions contained in a memory, such as the main memory 204. Such instructions may be read into the main memory 204 from another computer readable medium, such as hard disk 207 or a removable media drive 208. One or more processors in a multi-processing arrangement may also be employed to execute the sequences of instructions contained in main memory 204. In alternative embodiments, hard-wired circuitry may be used in place of or in combination with software instructions. Thus, embodiments are not limited to any specific combination of hardware circuitry and software.

As stated above, the computer system 201 includes at least one computer readable medium or memory for holding instructions programmed according to any of the teachings of the present disclosure and for containing data structures, tables, records, or other data described herein. Examples of non-transitory computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

Stored on any one or on a combination of computer readable media, the present disclosure includes software for controlling the computer system 201, for driving a device or devices for implementing the features of the present disclosure, and for enabling the computer system 201 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries, Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 203 for execution. A computer readable medium may take many forms, including but not limited to, non-volatile media or volatile media. Non-volatile media includes, for example, optical, magnetic disks, and magneto-optical disks, such as the hard disk 207 or the removable media drive 208.

Volatile media includes dynamic memory, such as the main memory 204. Transmission media, on the contrary, includes coaxial cables, copper wire and fiber optics, including the wires that make up the bus 202. Transmission media also may also take the form of acoustic or light waves, such as those generated during radio wave and infrared data communications.

Various forms of computer readable media may be involved in carrying out one or more sequences of one or more instructions to processor 203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 201 may receive the data on the telephone line and place the data on the bus 202. The bus 202 carries the data to the main memory 204, from which the processor 203 retrieves and executes the instructions. The instructions received by the main memory 204 may optionally be stored on storage device 207 or 208 either before or after execution by processor 203.

The computer system 201 may also include a communication interface 213 coupled to the bus 202. The communication interface 213 provides a two-way data communication coupling to a network link 214 that is connected to, for example, a local area network (LAN) 215, or to another communications network 216 such as the Internet. For example, the communication interface 213 may be a network interface card to attach to any packet switched LAN. As another example, the communication interface 213 may be an integrated services digital network card. Wireless links may also be implemented. In any such implementation, the communication interface 213 sends and receives electrical, electromagnetic or optical signals that carry digital data streams representing various types of information.

Network link 214 typically provides data communication through one or more networks to other data devices. For example, the network link 214 may provide a connection to another computer through a local network 215 (e.g., a LAN) or through equipment operated by a service provider, which provides communication services through a communications network 216. The local network 214 and the communications network 216 use, for example, electrical, electromagnetic, or optical signals that carry digital data streams, and the associated physical layer (e.g., CAT 5 cable, coaxial cable, optical fiber, etc.). The signals through the various networks and the signals on the network link 214 and through the communication interface 213, which carry the digital data to and from the computer system 201 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 201 can transmit and receive data, including program code, through the network(s) 215 and 216, the network link 214 and the communication interface 213. Moreover, the network link 214 may provide a connection through a LAN 215 to a mobile device 217 such as a personal digital assistant laptop computer, or cellular telephone.

Figure 3:
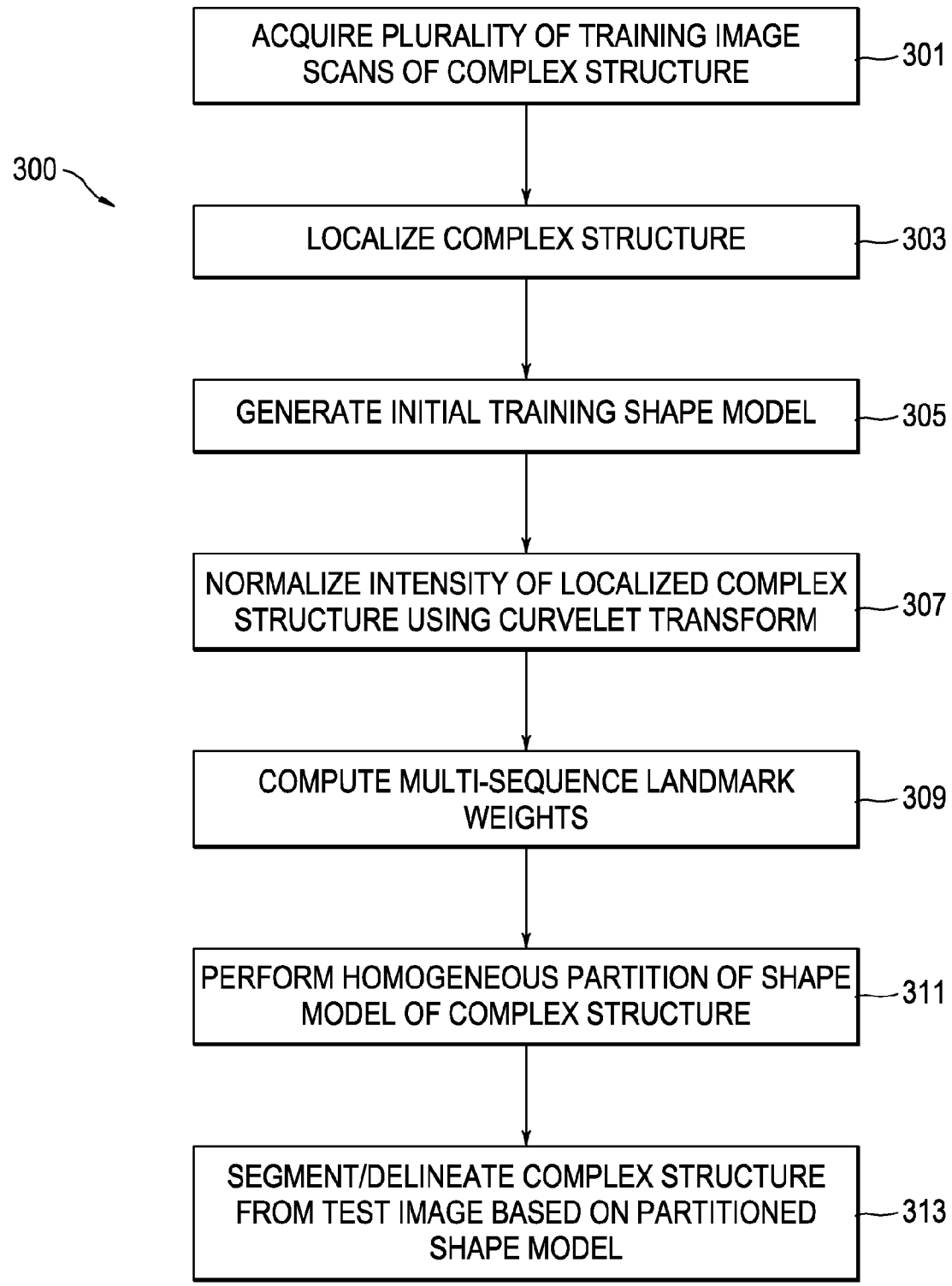
FIG. 3 is a flow diagram of an example segmentation process by which the present general inventive concept can be embodied.

According to one embodiment, the operations to segment a complex structure having variable local shape are generally depicted in FIG. 3. For instance, by one embodiment, the steps depicted in FIG. 3 can be used for segmenting the AVP of a patient. For the sake of simplicity, the steps of FIG. 3 are described with reference to the processing performed on the AVP. However, it must be appreciated that the operations depicted in FIG. 3 are equally applicable to other complex structures. Here, the word complex is intended to mean "made of multiple parts," and is particularly applicable to the AVP, which is made of multiple structures (optic nerves, optical tracts and the chiasm) that respond to stimulation by different data collection modalities (e.g. MRI: T1, T2, FLAIR) to overcome, by way of the general inventive concept, issues with contrast of the structures relative to surrounding tissue or objects. The operations of FIG. 3 are described in more detail below.

In operation 301, a plurality of training images of the AVP acquired from a plurality of subjects is acquired for purposes of training. It must be appreciated that the acquired images of the AVP may be MRI scans, CT scans, or other types of image scans that are obtained via other imaging modalities. By one embodiment, T1, T2, and FLAIR MRI scans are acquired from a plurality of patients. By one embodiment, the shape of an object can be represented by a set of 'n' points, which may be in any dimension. For example, the points can be in two or three dimensions. Shape can be defined as the quality of a configuration of points, which is invariant to transformation operations such as rotation, translation, and scaling. A statistical model of the shape is generally utilized to represent objects in images. Statistical shape models are sensitive to initialization. Initialization far from the structure boundary potentially compromises the performance of models. Accordingly, in operation 303, process 300 performs an unsupervised feature representation step for localizing objects in volumetric image data. By one embodiment, the localization is performed by employing a conditional space deep learning architecture based on a classifier (e.g., SAE classifier). Specifically, in step 303, a probability is assessed as to whether a particular point (or voxel) in an image is a part of the AVP.

Process 300 may proceed to operation 305, whereby an intensity normalization of the localized AVP image is performed based on a 3D curvelet transform. Following such intensity normalization, operation 307 may generate an initial AVP shape model. By one embodiment, in order to create and initialize the AVP shape model from MRI scan, the steps of landmark extraction and mean shape calculation are performed.

In order to create robust partitions of the shape model, landmarks in the training data may be ranked based on their strength in segmenting the AVP from the neighboring tissues. Specifically, in operation 309, multi-sequence landmark weighting may be applied to determine a relevance measure of each landmark. In order to adapt the statistical shape model to the multi-tubular AVP of variable local shape, the landmarks were divided into various partitions having consistent local shape and appearance variation. As shown in operation 311, a homogeneous partitioning of the AVP shape model is performed to fit each localized and optionally intensity-normalized portion of an AVP of a received image scan (e.g., a test image) to a corresponding partitioned portion of the AVP shape model. Thus, the process of formulating the partitioned shape model provisions for the advantageous ability of computing for each test image, a shape deformation of each portion of the AVP. Upon partitioning the shape model, the process applies the shape model to segment the target complex structure (i.e., delineate in an image). By one embodiment, statistical shape model of the present disclosure is designed to enable regional shape variations in the anatomy including pathology. Note that the automated quantification of the AVP is challenging due to its thin size, structural variation along the path, and non-discriminative contrast to the adjacent anatomic structures. It must be appreciated that the above described approach of formulating a partitioned shape model is in no way restricted to be applied only to the AVP. Rather, the robustness of the partitioned shape model can be applied to other anatomical structures sharing similar structural and appearance characteristics such as some of the other cranial and spinal nerves in the human body. Moreover, embodiments of the present disclosure may be applied to develop an appearance shape model for gesture recognition applications.

Each of the functions of the described embodiments (operations of process 300 depicted in FIG. 3) may be implemented by one or more processing circuits described above.

Unsupervised deep learning has garnered attention for robust discriminative feature representation such as in the characterization of brain tissues from MRI sequences. In a deep learning paradigm, low-level features are learned first and comprehensive high-level features are subsequently learned, hierarchically building in a layer-by-layer manner. In embodiments of the present disclosure, deep learning infrastructure is utilized to infer the feature representation from MRI sequences for both the localization of the AVP and the creation of appearance models to capture localized appearance characteristics of the AVP.

Inference and machine learning circuitry 126, for example, may be an SAE, i.e., a deep neural network comprising multiple layered sparse autoencoders (AEs) in which the output of every layer is directed to the input of the successive layer. Specifically, the output of a low-level AE (AE trained on low-level features) is the input of a high-level AE. Each AE comprises two components: an encoder and a decoder. The encoder aims to fit a nonlinear mapping that can project higher-dimensional observed data ($f(x_n) \in \mathbb{R}^n$)

onto its lower dimension feature representation. The decoder aims to recover the observed data ($f(\widehat{x_n})$) from the feature representation with minimal recovery error.

Embodiments of the present disclosure automatically segment the AVP (or other complex structure) using joint partitioned shape models as steered by an appearance model that is created using complementary data capture combined with deep machine learning. For MRI, such complementary data capture may be achieved through different MRI sequences, e.g., T1-weighted, T2-weighted and FLAIR MRI sequences. To create a solution that can work with different imaging equipment (e.g., diagnostic system 100), a multi-scale normalization technique may be applied as a pre-processing operation for intensity standardization of the test data to the reference range. In certain embodiments, such is achieved using a 3D curvelet transform. In the present inventive concept, classical statistical models are adapted to thin tubular structures by introducing a partitioned shape model approach for shape flexibility and robust appearance learning.

Figure 4:
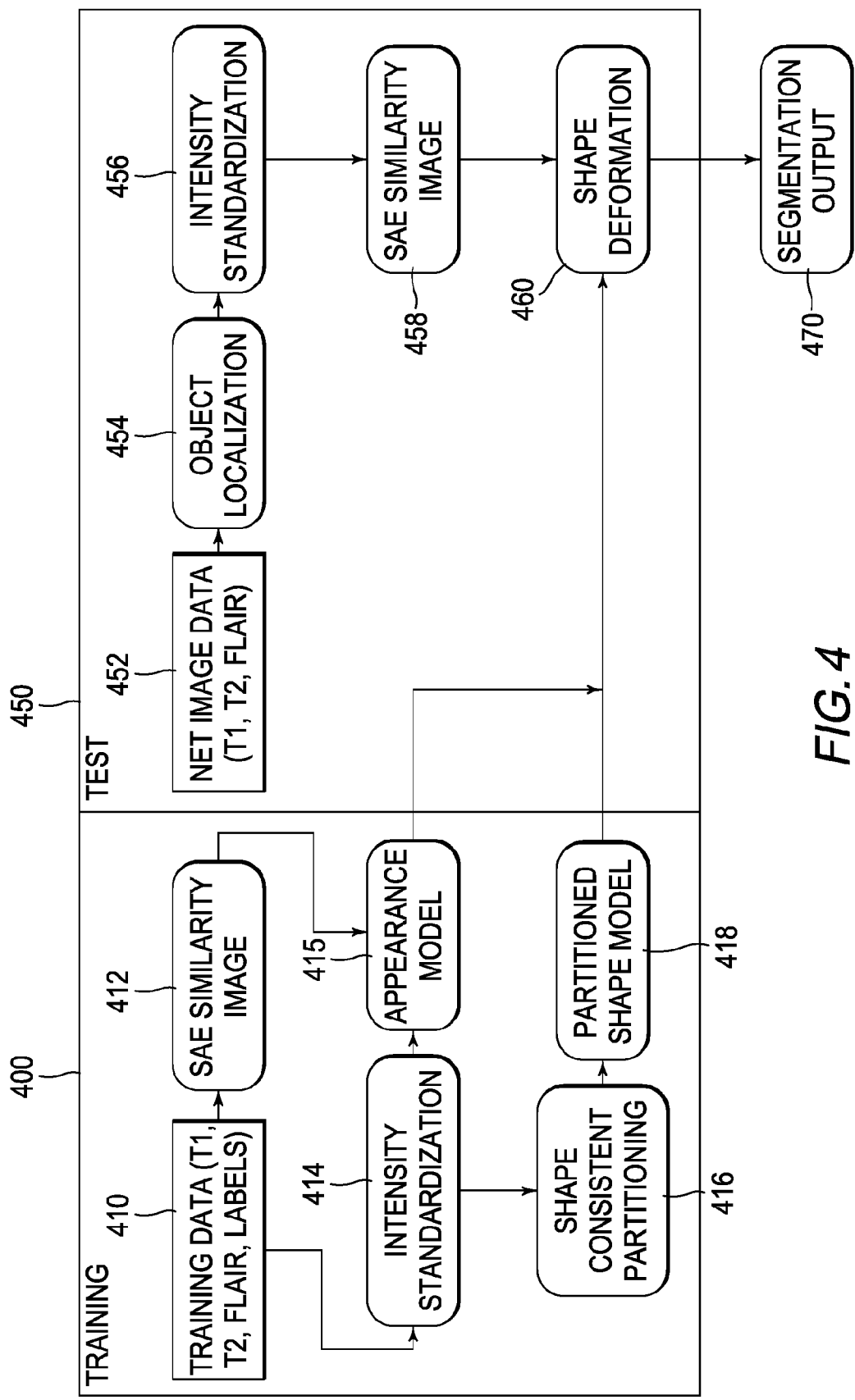
FIG. 4 is a functional block diagram of example training and testing stages by which the present general inventive concept can be embodied.

As illustrated in FIG. 4, the segmentation technique described herein includes a training stage 400 and a testing stage 450. Training component 400 and testing component 450 may be implemented via processing circuitry 120.

In operation 410 of training stage 400, ground truth data for purposes of training and detection may be acquired from several objects (e.g., patients) that have been manually analyzed or segmented and labeled by subject matter experts (e.g., clinical experts).

In operation 412, a similarity image of the complex structure (AVP) is constructed using a deep learning SAE architecture. Embodiments of the disclosure implement an unsupervised feature representation technique for the localization of objects in volumetric image data. The inventive concept may employ a conditional space deep learning architecture that gradually eliminates regions with lower probability of being the target object (e.g., an organ). Specifically, the object to be localized is modeled using a bounding box $\Omega$ centered at a voxel $x=(x_1,x_2,x_3)$, $\forall x \in \mathbb{R}^3$. The object localization problem is transformed into a machine classification problem to detect if a given voxel $\hat{x}$ in the test image is the centroid of the object of interest. Specifically, the aim is to find $\hat{x}$ that maximizes the posterior probability $p(x|f)$ over the entire space, e.g., $$\hat{x}=\hat{x}_1,\hat{x}_2,\hat{x}_3=\mathrm{argmax}_x p(x|f).$$

Due to the exponential number of hypotheses, an exhaustive search of the target object using the above equation is impractical. Instead, embodiments of the disclosure split the parameter space into marginal subspaces and the concatenation of marginal probabilities, $$p(x|f)=p(x_1|f)\cdot p(x_2|x_1,f)\cdot (x_3|x_1,x_2,f)$$

The inventive space learning technique provides an efficient runtime solution by training classifiers of higher-dimensional space features only in those regions with higher marginal probability. To further expedite the space learning process, instead of using the volumetric data directly for training, embodiments of the disclosure implement a deep learning classifier on a 2D depth projection image extracted from a 3D volume patch $\Omega$. Specifically, for a 3D volume centered at voxel x, in order to localize the object along a plane i={1,2,3}, embodiments of the invention may collect a 2D projection set $\mathcal{B}_i$ from $\Omega$ centered at x along plane i. For example, a minimum intensity projection (MinIP) or MaxIP may be used for AVP localization (e.g., $\mathcal{B}_i$=MinIP$_i$ ($f(\Omega)$)). The posterior probability discussed above can thus be rewritten in terms of 2D projections as:

$$\hat{x}_i = ar\,gmax_{\mathcal{B}p(x_i|} \mathcal{B}_i^{T_1}).$$

The superscript T1 indicates that the projection for localization was extracted from T1-weighted MRI sequences only. The size of the volumetric patch may be estimated empirically, such as to apply the largest bounding box that encloses the manually segmented ground truth data of the entire data set. Additionally, the bounding box may be aligned to the volume axes thus relieving the necessity of orientation estimation. Given a 2D projection $\mathcal{B}_i$, the classification problem for the location estimation may be formulated as to whether the center of the object of interest (AVP) along the plane i was located at the location $x_i$. A positive sample should satisfy $|x_i-x_i^l| \leq 1$ voxel, where $x_i^l$ denotes the position of the bounding-box enclosing the manually segmented ground truth of the AVP along the plane i. Then, the SAE classifier may be applied to $\mathcal{B}_i$ to infer the deep-learning feature representation (SAE similarity image). The trained SAE classifier may calculate the probability of each voxel in the test image being the centroid of AVP. A small number of candidates (e.g., 100) having the highest probability of being the centroid of AVP may be propagated to the next SAE stage where the same deep-learning classification procedure was repeated for the next plane. The final position of the bounding box enclosing the AVP may be estimated by the majority voting of, for example, the 100 highest probability candidates after the third plane. Using one aspect of the inventive approach described herein, a speed enhancement of up to 15 times in AVP localization was observed compared to an exhaustive search.

In operation 414, multiscale 3D curvelet-based intensity normalization may be performed. Unlike in CT scans that have standard intensity values due to the adaptation of Hounsfield units, the appearance characteristics of MRI sequences are influenced by acquisition settings, scanner technology, and proprietary reconstruction algorithms. Many computer-aided diagnosis techniques perform suboptimally when test data statistics do not resemble closely with the training data. Intensity normalization (or standardization) can help to modify the characteristics of test data to resemble closely to training data. Commonly used approaches to intensity normalization include linear rescaling, histogram matching, and histogram equalization. However, the quantitative analysis of small objects with low image contrast such as the AVP requires more elaborate and sophisticated normalization method.

In certain embodiments of the disclosure, a generic multiscale framework may be employed for the intensity normalization of volumetric images based on the localized energy standardization of 3D curvelet-transform subbands. The curvelet transform is a high-dimensional generalization of the wavelet transform designed to represent objects at different scales and orientations. Unlike wavelets, the transform is not only localized in space and scale but also in orientation. The intensity normalization method described herein exploits the frequency localization property of the curvelet transform by standardizing the local energies of individual subbands with respect to reference subbands. Once the centroid ($\hat{x}$) localizing the AVP within the image has been identified using the procedure outlined above, intensity normalization may be initiated for bounding-box ($\Omega$) around the centroid $\hat{x}$ only, as opposed to the entire image. The strategy is computationally efficient and has demonstrated better normalization for AVP segmentation.

In the curvelet domain, the input image is decomposed into several subbands having a given scale j and an orientation θ. A discrete curvelet transform of a function $f(x)$, $x \in \mathbb{R}^3$ is a dyadic sequence of curvelet coefficients $c(j,\theta,\omega)$ of scale j, orientation θ, and spatial location ω. The curvelet coefficients are defined by:

$$c(j,\theta,\omega) = \Sigma_x f(x) \phi_{j,\theta,\omega}$$

where $\phi_{j,\theta,\omega}$ is the 3D discrete curvelet transform $j,\theta \in \mathbb{Z}$ and $\omega=(\omega_1,\omega_2,\omega_3)$. The energy $e_{j,\theta}$ of an individual subband at scale j and orientation θ can be defined:

$$e_{j,\theta} = \left[\frac{1}{N-1}(c(j,\theta) - m(c(j,\theta)))^2\right]^{\frac{1}{2}},$$

where $c(j,\theta)$ is the 3D discrete curvelet subband, $$m(c(j,\theta)) = \frac{1}{N-1}\sum_{j,\theta} c(j,\theta)$$

is the average value of curvelet coefficients within the subband, and $N=\Sigma_{c(j,\theta)} 1$ is the number of coefficients within the subband. During training stage 400, reference energies $e_{j,\theta}^{ref}$ for every subband may be estimated from the training scans:

$$e_{j,\theta}^{ref} = \frac{1}{R}\sum_{r=1}^{R} e_{j,\theta}^r,$$

where R is the number of scans in the training set. During testing stage 450, the normalized curvelet coefficients are $$c_{norm}(j,\theta) = \lambda_{j,\theta} c(j,\theta) = \frac{e_{j,\theta}^{ref}}{e_{j,\theta}} c(j,\theta),$$

where $\lambda_{j,\theta}$ is the ratio of the reference subband energy to the test subband energy and measures how close the energy of test subband j is to that of the reference subband j. In order to have complete correspondence, the normalization described above is iteratively repeated on the reconstructed test image until $\lambda_{j,\theta} \cong 1$.

In one implementation of intensity standardization operation 414, for each reference image k in $\Omega_k^{ref} \in \mathbb{R}^d$, $\Omega_k^{ref}$ may be decomposed into $\log_2(n)-3$ curvelet scales including the coarsest curvelet scale. Then, for each subband $c_{j,\theta}(\Omega)$ of the curvelet, the reference energy $e_{j,\theta}^{ref}(\Omega)$ may be computed and stored for intensity standardization process 456 in testing component 250, as described below.

Following the AVP localization and intensity normalization of the localized bounding box image $f(\Omega)$, training stage 400 may transition to operation 416, whereby shape consistent partitioning is performed. First, the AVP shape model is initialized at the centroid $\hat{x}$. To create and initialize the AVP shape model from MRI, the following operations may be performed:

Landmark extraction: for k AVP shapes (manually annotated digital images), the centers of mass of all shapes are first aligned in the image space. Subsequently, $p_k \in \mathbb{R}^3$ landmarks at each of the k training shapes may be determined by a suitable surface construction technique, such as a marching cubes process.

Mean shape calculation: each training shape consists of a set of annotated landmarks aligned through Procrustes analysis, i.e., $X_k = [p_k^{1T} p_k^{2T} \ldots p_k^{HT}]$, where $p_k^i$ denotes the column vector of 3D coordinates of landmark i in the $k^{th}$ training shape $X_k$. If $X_k$ is the training shape k after the Procrustes analysis, the mean shape $\overline{X}$ may be calculated by averaging over the mean location of the landmarks in X. Subsequently, principle component analysis (PCA) may be used to compute the normalized eigenvectors and eigenvalues of the covariance matrix across the training shapes. Finally, a linear combination of eigenvectors may be used to generate an initial shape model $X_{init} = \overline{X} + \varphi b$, where $\varphi \in \mathbb{R}^{3k \times d}$ is a matrix with the top d eigenvectors (e.g. 98% of the energy) describing the principle mode of variation in the training shapes, and b is a vector of scaling values of the principle components. This type of PCA analysis is used by conventional shape models. The PCA of the entire shape and the constraints on b make the traditional shape models less flexible for local shape variations. Embodiments of the disclosure address this issue with a partitioned shape model, as described below. However, to create robust partitions, the landmarks in the training data may be ranked based on their strength in segmenting the AVP from the neighboring tissues.

Multi-sequence landmark weighting may be performed. As discussed previously, various regions of the AVP have varying degrees of appearance contrast. The optic tract region of the AVP typically has the greatest inter-observer variability due to varying contrast, making it hard to reliably define boundaries in the region even manually. Therefore, the landmarks belonging to the optic tract region may not be as reliable as those in the nerve region that showed a stable contrast with the neighboring tissues. In certain embodiments of the present disclosure, the concept of landmark weighting is employed based on their stability. The proposed weighting ranks landmarks based on the variability of their appearance profile. To calculate landmark weights, the intensity profile of size n×n×n around each landmark in every appearance channel (T1, T2, FLAIR, SAE) may be first extracted and then stacked together. For each landmark h, the covariance matrix $S^h$ of appearance profile across the training data may be calculated. A landmark is considered "stable" if it has lower variance (similar appearance characteristics). Subsequently, the weight of landmark h is calculated as:

$$w_h = \frac{1}{(1+tr(S^h))},$$

where tr( ) denotes the trace of the matrix.

In operation 216, landmark partitioning may be performed. In order to adapt the statistical shape model to the tubular AVP, the landmarks were divided into various partitions having consistent local shape and appearance variation. Since the AVP is a tubular structure, the resulting individual partitions should maintain this characteristic. To group H landmarks into G clusters and to make the adjacent partitions overlap for smoother boundary transition amongst the partitions, certain embodiments implement affinity propagation clustering. The deformable training shape $X_k$ may be decomposed into G partitioned shapes with each partition consisting of $h_g$ landmarks. In order to ensure that a certain partition did not contain only the "unstable" landmarks, the average landmark weight of each partition was also calculated. If the average weight of a partition was below a certain threshold τ, then it was merged with its immediate neighbor towards the chiasm.

In one embodiment, the shape consistent partitioning of operation 416 receives or otherwise obtains K training shapes $X_k$, a coefficient of point similarity measure $\beta \in [0,1]$, a coefficient of landmark weighting similarity measure and G, the number of partitions. The training shapes $X_k$ may be aligned into a common space removing the scale and translation. For each landmark h in the training set: (1) the position variation of each landmark h is calculated over the training shapes, e.g., $$v_h = \frac{1}{K} \sum_{k=1}^{K} \|p_h^k - \mu_h\|_2,$$

where $p_h$ is the position of landmark h and $\mu_h = 1/K \sum_{k=1}^{K} p_h^k$; and (2) the weight $w_h$ of each landmark is calculated over the training data, e.g., $$w_h = \frac{1}{(1 + tr(S^h))}.$$

A similarity function ρ may be computed to cluster the landmarks based on shape variation and spatial distance:

$$\rho_{i,j} = |v_i - v_j| - \beta \|\mu_i - \mu_j\|_2 - \gamma \|-w_i - w_j\|_2,$$

where $\rho_{i,j}$ is the degree of similarity between landmark i and landmark j. Affinity propagation clustering may be applied on the similarity function to cluster the landmarks into G shape consistent partitions. The average landmark weight $\overline{w^g}$ may be computed for each partition g and then it may be determined whether $\overline{w^g} < \tau$. If so, the corresponding partition may be merged with the neighboring partition in a predetermined direction on the structure (e.g., towards the chiasm).

A partitioned statistical shape model is generated in operation 218. In conventional shape models, shape parameters are represented in hyperspace defined by eigenvectors. In embodiments of the present invention, the partitioned hyperspaces utilize a hyperspace shape model constructed by fitting a second order PCA to partitioned training shapes in the new combined hyperspace $z=\overline{z}+AB$. The individual shape partition may be represented as $X_g=\overline{X}_g+\varphi_g b_g$, where g is the partition index, $X_g$ is the shape vector and $\overline{X}_g$ is the mean shape vector corresponding to partition g. $z=[b_1 \; b_2 \; \ldots \; b_G]$ is the combined shape vector of all partitions combining all shape parameters of different partitions and $\varphi_g$ is the eigenvector matrix. A is the matrix of eigenvectors of the shape in the hyperspace and B is the global scaling vector of the entire training shape to ensure that the deformable shaped formed by joining different partitions stays within the training shape constraints. During the model fitting, the shape vector $X_g$ for every partition may be updated iteratively until convergence. The scaling vector $b_g$ for every partition g may be calculated using the landmark weighting technique described above. The shape parameters for partition g may be determined based on appearance profile weighted landmarks $$b_g = (\varphi_g^T W_g \varphi_g)^{-1} \varphi_g^T W_g (X_g - \overline{X}_g),$$

where $W_g$ is the diagonal matrix containing the weights of landmarks in partition g. In order to ensure that the adjacent partitions have smooth connectivity during model fitting, overlapping regions between partitions may be introduced; thus overlapping landmarks appear in multiple partitions. During model fitting, the shape parameters for individual partitions may be calculated separately and the shape parameters of the overlapping landmarks may be computed using the mean of the shape parameters from the multiple partitions to which they belong.

In certain embodiments, multi-sequence deep learning features steered segmentation may be performed. The segmentation framework described herein follows an iterative approach where the location of each landmark is updated based on a specific appearance model (i.e., minimizing an energy function that combines the probability map of the AVP class obtained using the SAE architecture and additional intensity information from T1, T2, and FLAIR sequences). The SAE probability map for AVP was obtained for the localized region of test image by applying the SAE classifier trained using T1, T2, and FLAIR sequences and manually annotated ground truth.

During the testing stage 450, given the MRI sequences (T1, T2, and FLAIR) and an initial AVP shape $X_{init}$ 452, the method begins at operation 454 by localizing the target object (AVP) in a manner similar to that described above for training stage 200, followed by operation 456 whereby the intensity normalization of all MRI sequences is applied within the localized region (Ω).

In one embodiment, operation 456 receives or otherwise obtains $f^{test}$, the test image to be standardized, $e^{ref}$, the reference energy computed during training, and Ω, the region of interest. Ω may be assigned to a variable $\Omega^{std}$ and the following operations may be performed iteratively until $\lambda_{j,\theta}(\Omega) \rightarrow 1, \forall j, \theta$. First, the d-dimensional $\Omega^{std}$ may be decomposed into $\log_2(n)-3$ curvelet scales including the coarsest scale. Then, for each subband $c_{j,\theta}^{std}(\Omega)$, the energy $e_{j,\theta}^{std}(\Omega)$ is computed and $\lambda_{j,\theta}$ may be set to $$\frac{e_{j,\theta}^{ref}(\Omega)}{e_{j,\theta}^{std}(\Omega)}.$$

The d-dimensional inverse curvelet transform may be taken to find $\Omega^{std}$. $\Omega^{std}$ may be returned from operation 456 when $\lambda_{j,\theta} \cong 1$.

An SAE probability map (similarity image) may be created in operation 458. Finally, local shape models constructed for different partitions in the training stage may be used to guide the deformation of the initial shape individually. In certain embodiments, this deformation is guided by the local appearance models 415 is iteratively performed until convergence.

As described above, annotated landmarks are grouped using a suitable agglomerative hierarchical clustering method, such as by minimizing the objective function:

$$J(\Omega) = \alpha \int_\Omega \left(\frac{|V_\Omega \times V_l|}{|V_l|}\right)^2 \frac{L_{max}}{|V_l^2|_l} dl + (1-\alpha)\left(1 - \frac{\int_\Omega dl}{\int_S dl}\right),$$

where S is the set of all landmarks over the AVP and $\Omega \subset S$ denotes the local shape to be sub-partitioned into an optimal set of clusters. $V_\Omega$ denotes the dominant direction in $\Omega$, $V_l$ is the deformation vector for landmark l obtained through a suitable point distribution model over S, $\alpha$ is a coefficient that controls the relative weights (e.g., $\alpha$=0.8). The optimal number of partitions may be based on shape similarities calculated using, for example, a tailored Silhouette coefficient score. In one example, $\Omega_p$ may denote the set of landmarks for the shape partition p containing the landmark l and $\Omega_{p-l}$ may denote the set of landmarks for the same shape p with the landmark excluded. The contribution of landmark l in partition p may then be defined as $a_{p,l}=J(\Omega_p)-J(\Omega_{p-l})\in\{0,1\}$. A large $a_{p,l}$ indicates higher dissimilarity between landmark l and the shape $\Omega_p$. The cost of including landmark l in a partition p may be similarly defined as $b_{p,l}=J(\Omega_{p+l})-J(\Omega_p)$. The optimal number of partitions $p_{opt}$ may then be found by maximizing over $\Omega$:

$$\frac{1}{|l|}\sum_{p=1}^{|l|}\frac{f_p(b_l)-f_p(a_l)}{1\max(f_p(a_l),f_p(b_l))},$$

where $f(\cdot)$ is the logistic sigmoid function, $|l|$ is the total number of landmarks. To ensure that adjacent partitions are connected, an overlapping region may be introduced by sharing the boundary landmarks of the applicable partitions. During the shape model fitting, the shape parameters of the overlapping landmarks may be calculated using the parameters of the overlapping shapes.

Once the shape partitions have been generated, active shape model (ASM) may be performed on the individual shapes in the partitioned hyperspace. In order to adapt to local appearance characteristics, the following set of appearance features may be used to create overlapping partitioned statistical appearance models for each partition: (i) the intensities of neighboring voxels of each landmark, (ii) a three-class fuzzy c-means filter to robustly delineate both tissues in dark as well as bright foregrounds (e.g., the AVP passes through neighboring tissues of varying contrasts) and (iii) spherical flux to exploit the vessel-like characteristics. For example, for each landmark in the training set, the covariance $\Sigma$ of these features may be calculated across the training examples under the assumption that a lower variance of the appearance profile of a landmark, the higher would be the confidence in the landmark. The weight $w_l$ of a landmark l can therefore be calculated as $$w_l=\frac{1}{\left(1+tr(\Sigma_l)\right)},$$

where tr( ) denotes the trace of a matrix. The shape parameters for a partition p can be computed as $$b_p=(\varphi_p^T W_p \varphi_p)^{-1}\varphi_p^T W_p(x_p-\overline{x}_p),$$

where $\varphi_p$ is the eigenvector matrix, $x_p$ is the aligned training shape vector, $\overline{x}_p$ is the mean shape vector and $W_p$ is the diagonal weight matrix of landmarks belonging to partition p.

Pathologies can result in changes in shape and appearance of AVP at unpredictable locations. Statistical shape models have been very successful in segmenting healthy organs; however, they struggle to accommodate cases where the shape of the target structure cannot be predicted through training, such as in cases of AVP with OPG. Feature based approaches have demonstrated superior performance in segmentation of pathological tissues; however, offline feature-based training of pathological cases mostly fails due to large variations in both shape and appearance of the pathological structure. To relieve these shortcomings, embodiments of the present invention utilize an on-the-fly learning technique that utilizes, in real time, the initial delineation of the test image (obtained by operations described above) as training data of an appearance dictionary. For example, let $R_v(p)$ represent an image patch extracted from within the initial partition p centered at voxel $v\in\mathbb{R}^3$. An equal number of patches may be extracted from each partition. A 2D co-occurrence matrix on every slice of the patch is then calculated from $$R_{l_{p,i}}(p)$$

and gray-level features are extracted, e.g. autocorrelation, contrast, cluster shade, dissimilarity, energy, entropy, variance, homogeneity, correlation, cluster prominence, inverse difference, etc. To reduce the redundancy in the features, a k-SVD dictionary learning technique may be employed. A dictionary $D^p$ for every partition $p\in P$ is learned. For example, the centerline of the initial $ASM_p$ segment may be extracted using a shortest path graph. Subsequently, a point $c_{p,i}$ on the centerline may be chosen that is closest to the landmark $l_{p,i}$ in $l^2$-norm sense. Subsequently, co-occurrence features may be extracted from the path $$R_{c_{p,i}}(p).$$

The likelihood of voxels belonging to AVP is determined by using, for example, sparse representation classification, in which the classification problem is formulated as $$\mathrm{argmin}_\beta\|f'-D^p\beta\|_2^2+\lambda\|\beta\|_1,$$

where $f'$ is the discriminative feature representation of the testing voxel, $\beta$ is the sparse code for the testing voxel, $\lambda$ is the coefficient of sparsity and $r^p=f'-D_p\beta^p$ is the reconstruction residue of the sparse reconstruction. The likelihood h of a testing voxel y may be calculated with the indicator function h(v) with h(v)=1 if $r_y^p\le r_{y+1}^p$ and -1 otherwise, where $r_y^p$ is the reconstruction residue at testing voxel y and $r_{y+1}^p$ is the reconstruction residue at the neighboring next voxel to y in the normal direction outwards from the centerline. To move landmark $l_{p,i}$ on the surface of the segmentation, a search may be performed in the normal direction. A position with the most similar profile pattern to the boundary pattern is chosen as the new position of the landmark using the following objective function $$\mathrm{argmax}_h\left(\mathrm{argmin}_\delta(\|P_{\{-1,1\}}^h(c_{p,i}+\delta\cdot\vec{N}_{c_{p,i}})-\overline{P}_{\{-1,1\}}^h\|_2)+\frac{1}{|h|}\right)\bigg|\delta\in[0,A],$$

where $$\overline{P}_{\{-1,1\}}^h=\left[\underbrace{-1,-1,\ldots,-1}_{|h|},\underbrace{1,1,\ldots,1}_{|h|}\right]$$

is the desired boundary pattern, A is the search range, $\vec{N}_{c_{p,i}}$ is outward normal direction at point $c_{p,i}$ and δ is the position offset to be optimized. The length of the boundary pattern |h| is desirable to be maximized to mitigate the effects of noise and false positives in the pattern.

In order to enhance the robustness of the proposed method, a hierarchical segmentation approach may be deployed by incorporating scale dependent information. The coarser scales are intended to handle robustness while the finer scales are intended to improve accuracy of the boundary. The segmentation at the coarser scales may be used to initialize the finer scales. To achieve the hierarchical joint segmentation, the following steps may be adopted: (1) the number of shape partitions is dyadically increased from coarsest to finest scales. The number of partitions $n_j$ at the coarser scales j may be calculated as $n_j = \lceil 2^{-j} G^J \rceil$, where $G^J$ is the number of partitions at the finest scale J. (2) The patch size used to calculate the appearance features described above may be dyadically decreased from coarser to finer scales.

Figure 5A:
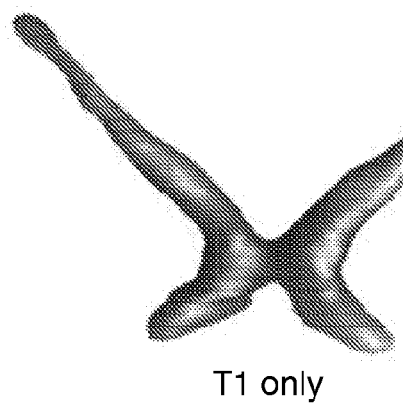
FIGS. 5A, 5B, 5C and 5D depict complex structures (i.e., the anterior visual pathway) of embodiments of the invention as compared with conventional techniques.
Figure 5B:
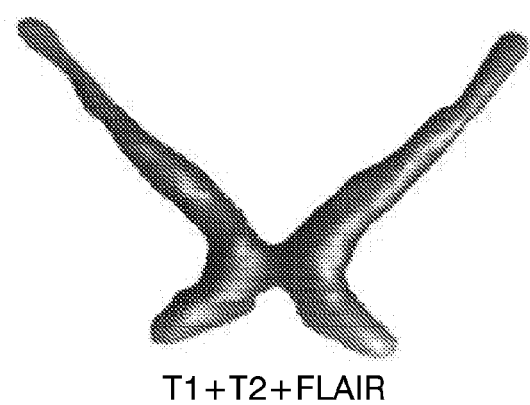
Figure 5C:
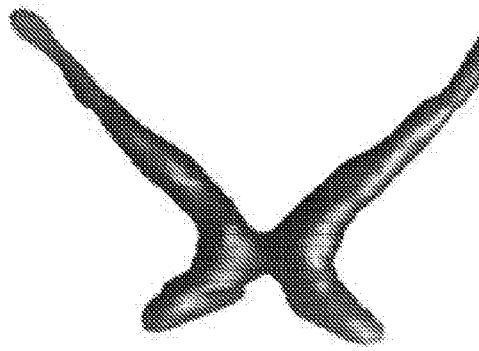
Figure 5D:
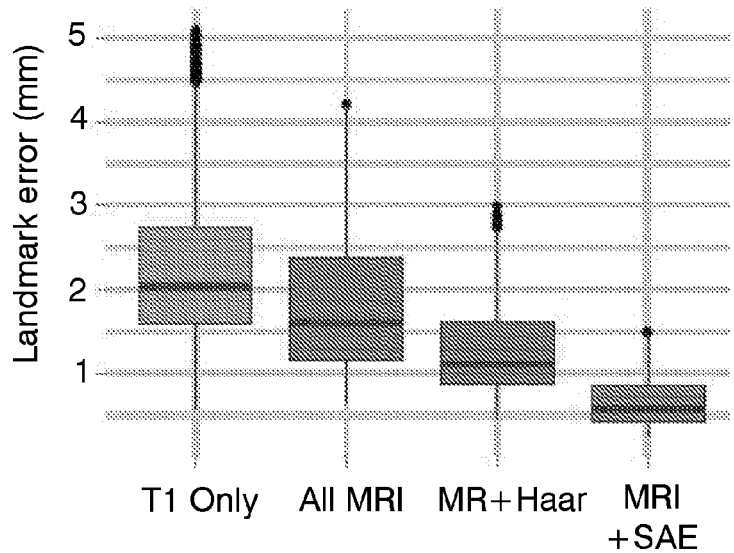

FIGS. 5A-5D depict a segmented AVP using different techniques as compared to that segmented by the present disclosure (FIG. 5C). FIG. 5A depicts a segmentation from T1-weighted data only, FIG. 5B depicts the segmentation from T1-weighted, T2-weighted and FLAIR data, and FIG. 5C depicts the segmentation from T1-weighted, T2-weighted and FLAIR data combined with the deep learning feature representation described above (SAE). FIG. 5D demonstrates differences in landmark error of various techniques compared to embodiments of the invention (far right). The improvement in landmark error by embodiments of the invention is readily apparent from these figures.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined and elements described as discrete may be distributed across many components. The scope of the disclosure should therefore be determined not with reference to the description above, but with reference to the appended claims, along with their full range of equivalents.

The invention claimed is:

1. A computer-based method of image segmentation of a structure of complex shape, the method comprising:
   receiving, by circuitry, a plurality of training images including the structure, the plurality of training images being acquired via one or more imaging modalities;
   applying, by the circuitry, a classifier to the plurality of training images to localize the structure within the plurality of training images, the localized structure being defined by a voxel having a centroid of the structure;
   generating, by the circuitry, an initial structure shape model based on the centroid of the structure;
   partitioning, by the circuitry, the initial structure shape model into a predetermined number of portions, an appearance and shape of each of the portions being determined by a classifier; and
   calculating, by the circuitry, a partitioned structure shape model based on the partitioning of the initial structure shape model.

2. The computer-based method of claim 1, wherein the one or more imaging modalities is one or more of a computed tomography (CT), magnetic resonance imaging (MRI), positron emission tomography (PET), PET-CT, ultrasound, photography and video images.

3. The computer-based method of claim 2, wherein the plurality of training images includes a first type of MRI scan, a second type of MRI scan, and a third type of MRI scan.

4. The computer-based method of claim 3, wherein the first type of MRI scan is a contrast-enhanced T1 MRI scan, the second type of MRI scan is a fat-saturated T2 MRI scan, and the third type of MRI scan is a fluid-attenuated-inversion-recovery (FLAIR) MRI scan.

5. The computer-based method of claim 1, wherein the structure is an anterior visual pathway of a patient.

6. The computer-based method of claim 1, further comprising:
   normalizing, by the circuitry, an intensity of the localized structure within the plurality of training images, the normalizing being based on a 3D-curvelet transform function.

7. The computer-based method of claim 6, wherein the initial structure shape model is based on the intensity normalized localized structure within the plurality of training images.

8. The computer-based method of claim 6, wherein the partitioning the initial structure shape model into the predetermined number of portions includes
   grouping, by the circuitry, the extracted landmarks,
   calculating, by the circuitry and based on the computed weighting score associated with each of the extracted landmarks within the grouping, an average extracted landmark weight,
   merging, by the circuitry and when the average extracted landmark weight of a particular grouping is below a predetermined threshold, the grouping with an adjacent neighbor.

9. The computer-based method of claim 8, wherein the structure is an anterior visual pathway of a patient and the adjacent neighbor is one that is nearer an optic chiasma of the patient.

10. The computer-based method of claim 1, wherein the generating the initial structure shape model includes
    extracting, by the circuitry, landmarks from a plurality of local shapes of the structure, each local shape being linked in the initial structure shape model.

11. The computer-based method of claim 10, wherein the generating the initial structure shape model includes
    computing, by the circuitry, a weighting score associated with each of the extracted landmarks, the weighting score corresponding to a relevance of each of the extracted landmarks.

12. The computer-based method of claim 11, further comprising
    ranking, by the circuitry, each of the extracted landmarks based on the computed weighting score associated with each of the extracted landmarks.

13. The computer-based method of claim 1, wherein the classifier is based on a stacked autoencoder.

14. A device for image segmentation of a structure of complex shape, the device comprising:
    circuitry configured to
       receive a plurality of training images including the structure, the plurality of training images being acquired via one or more imaging modalities,
       apply a classifier to the plurality of training images to localize the structure within the plurality of training images, the localized structure being defined by a voxel having a centroid of the structure, generate an initial structure shape model based on the centroid of the structure, partition the initial structure shape model into a predetermined number of portions, an appearance and shape of each of the portions being determined by a classifier, and calculating a partitioned structure shape model based on the partitioned initial structure shape model.

15. The device of claim 14, wherein the one or more imaging modalities is one or more of a computed tomography (CT), magnetic resonance imaging (MRI), positron emission tomography (PET), PET-CT, ultrasound, photography and video images.

16. The device of claim 15, wherein the plurality of training images includes a first type of MRI scan, a second type of MRI scan, and a third type of MRI scan.

17. The device of claim 16, wherein the first type of MRI scan is a contrast-enhanced T1 MRI scan, the second type of MRI scan is a fat-saturated T2 MRI scan, and the third type of MRI scan is a fluid-attenuated-inversion-recovery (FLAIR) MRI scan.

18. The device of claim 14, wherein the structure is an anterior visual pathway of a patient.

19. The device of claim 14, wherein the circuitry is further configured to normalize an intensity of the localized structure within the plurality of training images, the normalizing being based on a 3D-curvelet transform function.

20. The device of claim 19, wherein the initial structure shape model is based on the intensity normalized localized structure within the plurality of training images.

21. The device of claim 19, wherein the circuitry is configured to partition the initial structure shape model into the predetermined number of portions by grouping the extracted landmarks, calculating, based on the computed weighting score associated with each of the extracted landmarks within the grouping, an average extracted landmark weight, merging, when the average extracted landmark weight of a particular grouping is below a predetermined threshold, the grouping with an adjacent neighbor.

22. The device of claim 21, wherein the structure is an anterior visual pathway of a patient and the adjacent neighbor is one that is nearer an optic chiasma of the patient.

23. The device of claim 14, wherein the circuitry is further configured to extract landmarks from a plurality of local shapes of the structure, each local shape being linked in the initial structure shape model.

24. The device of claim 23, wherein the circuitry is further configured to compute a weighting score associated with each of the extracted landmarks, the weighting score corresponding to a relevance of each of the extracted landmarks.

25. The device of claim 24, wherein the circuitry is further configured to rank each of the extracted landmarks based on the computed weighting score associated with each of the extracted landmarks.

26. The device of claim 14, wherein the classifier is based on a stacked autoencoder.

* * * * *